(12) United States Patent
Miranda et al.

(10) Patent No.: US 9,458,258 B2
(45) Date of Patent: Oct. 4, 2016

(54) PROCESS FOR THE PREPARATION OF CATALYTIC SUPPORT AND SUPPORTED BIMETALLIC CATALYSTS FOR PRODUCTION OF HOMOPOLYMERS AND COPOLYMERS OF ETHYLENE WITH α-OLEFINS, OF HIGH AND ULTRA HIGH MOLECULAR WEIGHT AND WITH BROAD MOLECULAR WEIGHT DISTRIBUTION IN SLURRY, BULK AND GAS PHASE PROCESSES AND PRODUCTS THEREOF

(75) Inventors: Marcia Silva Lacerda Miranda, Porto Alegre (BR); Fernanda Oliveira Vieira da Cunha, Porto Alegre (BR)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 13/041,028

(22) Filed: Mar. 4, 2011

(65) Prior Publication Data
US 2011/0160043 A1 Jun. 30, 2011

Related U.S. Application Data

(62) Division of application No. 12/167,611, filed on Jul. 3, 2008.

(30) Foreign Application Priority Data

Oct. 19, 2007 (BR) ..................... 0705994

(51) Int. Cl.
*C08F 4/44* (2006.01)
*C08F 10/02* (2006.01)
*C08F 10/00* (2006.01)
*C08F 4/659* (2006.01)
*C08F 110/02* (2006.01)
*C08F 210/16* (2006.01)

(52) U.S. Cl.
CPC ............... *C08F 10/02* (2013.01); *C08F 10/00* (2013.01); *C08F 4/65912* (2013.01); *C08F 110/02* (2013.01); *C08F 210/16* (2013.01)

(58) Field of Classification Search
CPC ........................................................ C08F 4/44
USPC ......................................................... 526/129
See application file for complete search history.

(56) References Cited

U.S. PATENT DOCUMENTS

| | | | | |
|---|---|---|---|---|
| 5,847,059 A | * | 12/1998 | Shamshoum et al. | 526/116 |
| 6,875,828 B2 | * | 4/2005 | Kuo et al. | 526/114 |
| 2007/0123414 A1 | * | 5/2007 | Kao et al. | 502/103 |
| 2007/0213482 A1 | | 9/2007 | Xiao et al. | |
| 2008/0194780 A1 | | 8/2008 | Kuo et al. | |

* cited by examiner

*Primary Examiner* — Yong Chu
*Assistant Examiner* — Sonya Wright
(74) *Attorney, Agent, or Firm* — Duane Morris LLP

(57) ABSTRACT

The present invention relates to a process for the preparation of catalytic support and the supported bimetallic catalysts, used in the production of ethylene homopolymers and ethylene copolymers with α-olefins, of high and ultra high molecular weight with broad molecular weight distribution, in gas or liquid phase polymerization processes, the latter being in slurry, bulk or suspension, and the products obtained from these processes.

7 Claims, No Drawings

PROCESS FOR THE PREPARATION OF CATALYTIC SUPPORT AND SUPPORTED BIMETALLIC CATALYSTS FOR PRODUCTION OF HOMOPOLYMERS AND COPOLYMERS OF ETHYLENE WITH α-OLEFINS, OF HIGH AND ULTRA HIGH MOLECULAR WEIGHT AND WITH BROAD MOLECULAR WEIGHT DISTRIBUTION IN SLURRY, BULK AND GAS PHASE PROCESSES AND PRODUCTS THEREOF

CROSS REFERENCE TO RELATED APPLICATIONS

This application is a divisional application, which is based on and claims priority to co-pending U.S. Utility patent application Ser. No. 12/167,611, filed on Jul. 3, 2008, which claims priority to co-pending Brazilian Patent Application No. PI 0705994-9 filed Oct. 19, 2007, which is entirely incorporated herein by reference.

FIELD OF THE INVENTION

The present invention relates to supported bimetallic catalysts, to the process for preparation of these supported bimetallic catalysts in the absence of activators such as aluminoxanes or organoboron compounds, as well as the process for catalytic support, with application in reactions of ethylene homopolymerization and ethylene copolymerization with α-olefin. The invention relates, also, to the products acquired from these processes: ethylene homopolymers and ethylene copolymers with α-olefins of high molecular weight, such as HMWPE and UHMWPE, with broad molecular weight distribution, thus produced. The catalytic system presented in this patent application can be used in polymerization processes in slurry, bulk and gas-phase.

BACKGROUNDS OF THE INVENTION

Traditionally, ethylene and α-olefins can be polymerized or copolymerized, using catalytic systems containing a transition metal, such as titanium, and an organometallic compound, such as alkylaluminum. More recently, homogeneous catalytic systems, such as, for example, metallocene bis(cyclopentadienyl) titanium dialkyl in the presence of trialkylaluminum and water, showed active for ethylene polymerization. The German patents 2,608,863 and 2,608,933 show the use of this type of catalytic system in the ethylene polymerization.

Thus, metallocene-type complexes are increasingly becoming important as a new generation of catalysts for preparation of polyolefins. By metallocene, it is understood transition metal complexes containing one or more π ligands of the type cyclopentadienyl, substituted or not, such as, for example, "sandwich"- or "half-sandwich"-type compounds, i.e., metal complexed to two π ligands or one π ligand, respectively. These complexes become active in polymerization of olefins when activated by an organometallic compound also known by cocatalyst. Known examples of cocatalysts, widely used in the activation of metallocenes, are the aluminoxanes, particularly methylaluminoxane. The European patent EP 0035242 informs a process for preparation of ethylene polymers in the presence of catalytic systems of the type activated metallocenes by aluminoxane. Additional learning of homogeneous catalytic systems comprising metallocene and aluminoxane are showed in the patent EP 0069951.

Comparatively to the conventional Ziegler-Natta catalytic system, the homogeneous metallocene catalytic systems not only present high catalytic activities, but also capacity to control the properties of the polyolefins as function of the compounds used in its synthesis and reaction conditions. Nevertheless, these catalytic systems present the disadvantage to use a great excess of aluminoxanes, in relation to the content of transition metal of the catalyst, to yield acceptable productivitities. Due to the high cost of the aluminoxanes and also to the necessity of extra work of purification of the polymers obtained, the production of polyolefins in industrial scale, based on such catalytic systems, generally becomes anti-economical. Besides, the use of toluene, which is commonly used in the formulation of aluminoxanes, particularly methylaluminoxane (herein referred as MAO), is increasingly becoming highly undesirable for toxicological reasons in relation to the field of application of the polyolefins and for storage stability reasons of the highly concentrated formulations (tendency to gel formation).

Other disadvantage of these homogeneous catalytic systems is that the polymer obtained presents medium size of small particle and apparent low density. When used in gas phase or slurry processes, there is a tendency to dirt the reactor through the formation of polymer deposits in the surface of the reactor or stirrer walls.

Thus, in the attempt to overcome the problems mentioned above, such homogeneous catalytic systems were supported, as already known in the state-of-art. A supported metallocene catalytic system is described in the U.S. Pat. No. 5,086,025 where, the homogeneous metallocene is deposited on a silica containing aluminoxanes, which was obtained by the water reaction absorbed in silica with trialkylaluminum. Different methods to support metallocene catalysts are described, for example, in the patents WO 95/07939, WO 87/03889, WO 94/28034, EP 206794 and EP 250600, where derivatives of aluminoxane compounds are used as cocatalysts. In addition to aluminoxane compounds, organoboron compounds can also be used as catalysts and the patents WO 91/09882, WO 94/03506, EP 628574 and WO 95/15815 teach how to use them along with the metallocene catalysts in support process. In addition to the question of cost associated to the use of aluminoxane and organoboron compounds, the procedure to prepare such supported catalysts is complicated and expensive.

In addition to the use of supported bimetallic catalysts, the state-of-art recognized that the benefits can be obtained along with technologies of metallocene catalysts and Ziegler-Natta in the production of low pressure polyolefins. Such preparations, generally known as bimetallic catalytic systems or bimetallic catalysts, refers to two more catalytic compounds used in combination with, at least, an activator and, optionally, with a support, which are useful in the polymerization of olefins.

The U.S. Pat. No. 5,525,678 informs a supported catalytic composition comprising a magnesium-based compound and the mixture of an activated metallocene compound by aluminoxane and a non-metallocene compound, such as halocarbons or alkoxydes of Ti or V. Such composition is able to produce polymers with broad or bimodal molecular weight distribution (herein referred as MWD) in a single reactor, seen the present different compounds present different responses to $H_2$.

Patent EP 0790259 A1 shows that it is possible to obtain monomodal polyolefin resins and broad MWD using, for this, a supported catalyst containing isomeric mixture of metallocenes with bridge, of the type $(IndH_4)_2R''MQ_2$, where Ind is the indenyl group, substituted or not, R" is the bridge between indenyl groups and can be a dialkylgermanium, dialyklsilicium or siloxane group, Q is a radical of the alkyl or aryl type and M is the transition metal chosen among Ti, Zr or Hf. This isomeric mixture of metallocenes needs to be activated, previously to support, by aluminoxane.

Patent EP 1403288 A1 presents the preparation of supported catalyst containing the mixture of hafnocene and other metallocene or non-metallocene compound to obtain polyolefin with broad or multimodal MWD where, the hafnocene produces a high molecular weight fraction and the other metallocene or non-metallocene compound-produces the low molecular weight fraction. This catalyst containing the mentioned mixture must be activated by ionization agents and with non-coordinating capacity, such as borates or aluminates.

Patent U.S. Pat. No. 6,664,351 claims the production of ethylene copolymers with broad MWD from a mixture of racemic isomers and meso of a stereorigid metallocene catalyst supported in an organic support and activated by aluminoxane-type compounds.

Patent U.S. Pat. No. 6,384,144 from Basell, claims the production of a reactor blend obtained from a mixture of catalytic systems comprising transition metal compounds form the beginning of the Periodic Table (groups 3 to 7 of the Periodic Table) and transition metals from the end of the Periodic Table (groups 8 to 11 of the Periodic Table). This mixture is able to produce at least two types of linear polyethylenes with different contents of branching, after activation by alumonoxane-based cocatalysts.

Several catalytic systems have been used to obtain the polyethylene with high molecular weight, presenting the final polymer an extremely high molecular weight. Polyethylene of this type presents a molecular weight ranging from 10 to 20 times the molecular weight of a HDPE. This polymer usually is known as high and ultra-high molecular weight polyethylene, called henceforth HMWPE and UHMWPE, respectively. HMWPE shows viscometric molecular weight (herein referred as Mv) that may range between 500,000 and 2,500,000 g/mol, while UHMWPE shows Mv that is above 2,500,000 g/mol.

The commercially produced UHMWPE in moderate pressures and temperatures, is traditionally obtained by Ziegler-Natta catalyst, as showed in the patents U.S. Pat. No. 5,880,055 and BR 9,203,645A. Other characteristic of these polymers is that they show similar properties to conventional HDPE which is the broad distribution of molecular weight (herein referred as MWD), with the Mw/Mn value in the range from 4 to 20.

The LG Chem., in its patent WO 06080817, claims to obtain polymers presenting a fraction of high molecular weight of 1,000,000 g/mol and with high amount of comonomer incorporated, obtained from a supported catalyst containing a mixture of metallocenes with transition metals of the group 3 of the Periodic Table. Such catalysts are activated by aluminoxane or organoboron compounds to obtain polymers that show MWD ranging between 5 and 30.

The patent CA 2281559, in its turn, shows that it is possible to obtain high and ultra-high molecular weight polyolefins from catalysts containing a mixture of metallocene and Ziegler-Natta supported in styrene polymers and copolymers.

The patent U.S. Pat. No. 6,384,144 comments that the polymerization process can occur in liquid or gaseous phase, but the preference is by the liquid phase process.

U.S. Pat. No. 6,664,351 also comments that the catalyst can be used not only in the gas phase, but also in the liquid phase. Patent EP 00676418 A1, in its turn, talks about the polymerization process is preferably performed in the gas phase.

Therefore, references in the state of the art, considered alone or in combination, do not describe nor suggest a method to prepare supported bimetallic catalysts destined to polymerization reactions of ethylene and copolymerization of ethylene with α-olefins from a mixture of two transition metals supported in a catalytic support and an activator with base of organometallic compounds of the groups 2 or 13 of the Periodic Table and that are not aluminoxanes or organoboron, where the first transition metal compound is preferably a transition metal complex of the groups 4 or 5 of the Periodic Table containing ligands like monocyclopentadienyl, monoindenyl or monofluorenyl, substituted or not, and the second transition metal compound is preferably a transition metal complex of the groups 4 or 5 of the Periodic Table containing ligands like halides, alkyl, alkoxy or monocyclopentadienyl, monoindenyl or monofluorenyl, substituted or not, and that produce ethylene homopolymers and copolymers with α-olefins, with high molecular weight (HMWPE) and of ethylene homopolymers and copolymers with α-olefins, with ultra-high molecular weight (UHMWPE), with broad molecular weight distribution, used in slurry, bulk and gas phase processes, as described and claimed in the present application.

The obtained ethylene homopolymers and ethylene copolymers with α-olefins show high molecular weight in the presence of mentioned supported bimetallic catalysts. More specifically, the present invention relates to a process for preparation of supported bimetallic catalysts, from a mixture of two transition metals of the groups 4 or 5 of the Periodic Table supported on a catalytic support and an organometallic compound of the groups 2 or 13 of the Periodic Table, and which are not aluminoxanes or organoboron compounds, where the first transition metal compound is preferably a transition metal complex of the groups 4 or 5 of the Periodic Table containing ligands like monocyclopentadienyl, monoindenyl or monofluorenyl, substituted or not, and the second transition metal compound is preferably a transition metal complex of the groups 4 or 5 of the Periodic Table containing ligands like halides, alkyl, alkoxy or monocyclopentadienyl, monoindenyl or monofluorenyl, substituted or not, for ethylene homopolymerization and ethylene copolymerization with α-olefins, from a catalytic support prepared in the absence of activators such as aluminoxanes or organoboron based compounds. More specifically, the present invention also relates to a process to produce ethylene homopolymers or ethylene copolymers with α-olefins, with high molecular weight and ultra high molecular weight, such as HMWPE and UHMWPE, with broad MWD, in the presence of the mentioned supported bimetallic catalysts supported on a catalytic support and prepared in the absence of activators such as aluminoxanes or organoboron based compounds. The invention also relates to the catalytic support prepared in the absence of activators such as aluminoxanes or organoboron based compounds, to the supported bimetallic catalysts obtained from a mixture of 2 or more metallocene catalysts based on transition metal of the groups 4 or 5 of the Periodic Table, containing ligands like monocyclopentadienyl, monoindenyl or monofluorenyl, substituted or not, or a mixture of Ziegler-Natta catalyst based on transition metal of the groups 4 or 5 of the Periodic Table and a metallocene catalyst based on transition metal of the groups 4 or 5 of the Periodic Table, containing ligands like monocyclopentadienyl, monoindenyl or monofluorenyl, substituted or not, to the ethylene homopolymers and ethylene copolymers with α-olefins, with high molecular weight and ultra high molecular weight, such as HMWPE and UHMWPE, and broad MWD, and to the polymerization processes to produce ethylene homopolymers and ethylene copolymers with α-olefins with high molecular weight and ultra high molecular weight in presence of the mentioned supported bimetallic catalysts and in the absence of activators such as aluminoxanes or organoboron based compounds.

SUMMARY OF THE INVENTION

The present invention relates to a process for the preparation of supported bimetallic catalysts obtained from a mixture of two transition metals supported in a catalytic support and an activator based on organometallic compounds of the groups 2 or 13 of the Periodic Table and which is not aluminoxanes or organoboron compounds, where the first transition metal compound is preferably a transition metal complex of the groups 4 or 5 of the Periodic Table containing ligands like monocyclopentadienyl, monoindenyl or monofluorenyl, substituted or not, and the second transition metal compound is preferably a transition metal complex of the groups 4 or 5 of the Periodic Table containing ligands like halides, alkyl, alkoxy or monocyclopentadienyl, monoindenyl or monofluorenyl, substituted or not.

The process to obtain supported bimetallic catalysts of the present invention involves the reaction between (1) catalytic support and (2) reaction product between 2 transition metals where the first transition metal compound is preferably a transition metal complex of the groups 4 or 5 of the Periodic Table containing ligands like monocyclopentadienyl, monoindenyl or monofluorenyl type, substituted or not, and the second transition metal compound is preferably a transition metal complex of the groups 4 or 5 of the Periodic Table containing ligands like halocarbon, alkyl, alkoxy types or monocyclopentadienyl, monoindenyl or monofluorenyl groups, substituted or not and (3) an activator based on organometallic compounds of the groups 2 or 13 of the Periodic Table and that are not aluminoxane or organoboron compounds.

The process of the present invention of preparation to obtain the catalytic support comprises the following steps:
a) Impregnation of a silica, thermally activated, using a solution of organometallic compound of the groups 2 or 13 of the Periodic Table, in an inert organic solvent;
b) Preparation of a solution of one or more magnesium-based compounds with a polar solvent;
c) Impregnation of the silica obtained in (a) using the prepared solution in (b);
d) Removal of the polar solvent by vacuum;
e) Reaction of the solid obtained in (d) with solution of one or more organometallic compounds of the groups 2 or 13 of the Periodic Table, in an inert organic solvent;

The process of the present invention of preparation of supported bimetallic catalysts comprised the following steps:
f) Reaction of a first transition metal complex of the groups 4 or 5 of the Periodic Table containing ligands like monocyclopentadienyl, monoindenyl or monofluorenyl type, substituted or not, with a second transition metal compound of the groups 4 or 5 of the Periodic Table containing ligands like halocarbon, alkyl, alkoxy types or monocyclopentadienyl, monoindenyl or monofluorenyl groups, substituted or not, in an inert organic solvent;
g) Reaction of the solid product obtained in (f) with the solution of one or more organometallic compounds of the groups 2 or 13 of the Periodic Table in an inert organic solvent;
h) Reaction of the solid product obtained in (e) with the product in solution obtained in (g);
i) Optionally, reaction between the solid obtained in (h) with a halogenant agent;

Thus, the present invention provides a process to obtain a catalytic support based on silica thermally treated with a solution of organometallic compound of the groups 2 or 13 of the Periodic Table, and that is not an aluminoxane or organoboron compound, and subsequent treated with of a magnesium-based compound solution with a polar solvent.

The present invention also provides a process to obtain catalytic support where it is performed a further treatment with solution of one or more organometallic compounds of the groups 2 or 13 of the Periodic Table, and that are not an aluminoxane or organoboron compounds.

The present invention also provides a process for production of reaction product between 2 transition metals where the first transition metal compound is preferably a transition metal complex of the groups 4 or 5 of the Periodic Table containing ligands like monocyclopentadienyl, monoindenyl or monofluorenyl type, substituted or not, and the second transition metal compound is preferably a transition metal complex of the groups 4 or 5 of the Periodic Table containing ligands like halocarbon, alkyl, alkoxy types or monocyclopentadienyl, monoindenyl or monofluorenyl type, substituted or not.

The present invention also provides a process for preparation of a reaction product between a solution of one or more organometallic compound of the groups 2 or 13 of the Periodic Table, and that are not an aluminoxane or organoboron compounds, and the product obtained in the reaction between 2 transition metals where the first transition metal compound is preferably a transition metal complex of the groups 4 or 5 of the Periodic Table containing ligands like monocyclopentadienyl, monoindenyl or monofluorenyl type, substituted or not, and the second transition metal compound is preferably a transition metal complex of the groups 4 or 5 of the Periodic Table containing ligands like halocarbon, alkyl, alkoxy types or monocyclopentadienyl, monoindenyl or monofluorenyl groups, substituted or not.

The present invention also provides the reaction between the catalytic support, previously prepared, with the product obtained from the reaction between a solution of one or more organometallic compounds of the groups 2 or 13 of the Periodic Table, and that are not aluminoxane or organoboron compounds, and the product obtained in the reaction between 2 transition metals where the first transition metal compound is preferably a transition metal complex of the groups 4 or 5 of the Periodic Table containing ligands like monocyclopentadienyl, monoindenyl or monofluorenyl type, substituted or not, and the second transition metal compound is preferably a transition metal complex of the groups 4 or 5 of the Periodic Table containing ligands like halocarbon, alkyl, alkoxy types or monocyclopentadienyl, monoindenyl or monofluorenyl groups, substituted or not.

The present invention also provides a reaction between the solid obtained previously and a halogenant agent. The present invention also provides supported bimetallic catalysts obtained from a mixture of two supported transition metals in a catalytic support and an activator based on organometallic compounds of the groups 2 or 13 of the Periodic Table and that are not aluminoxane or organoboron compounds, where the first transition metal compound is preferably a transition metal complex of the groups 4 or 5 of the Periodic Table containing groups of the type monocyclopentadienyl, monoindenyl or monofluorenyl, substituted or not, and the second transition metal compound is preferably a transition metal complex of the groups 4 or 5 of the Periodic Table containing groups of the halocarbon, alkyl, alkoxy type or monocyclopentadienyl, monoindenyl or monofluorenyl groups, substituted or not, specially proper for the production of ethylene homopolymers and ethylene copolymers with α-olefins, with high molecular weight and ultra high molecular weight, such as HMWPE and UHMWPE, with broad MWD.

The present invention also provides the preparation of ethylene homopolymers and ethylene copolymers with α-olefins, with high molecular weight (HMWPE) and ultrahigh molecular weight (UHMWPE) α-olefins, from supported bimetallic catalyst mentioned above.

After the process of preparation of the catalysts, from the catalytic support, as mentioned above, along with the supported bimetallic catalysts, acquired according to process already described in this report, the supported bimetallic catalyst is put in contact with the cocatalyst, which is an organometallic compound of the groups 2 or 13 of the Periodic Table and are not aluminoxane or organoboron compounds, and is used to activate the supported bimetallic catalyst. This mixture of supported bimetallic catalyst and cocatalyst is put in contact with ethylene and alternatively to an α-olefin at a temperature ranging from 25° to100° C., preferably between 50° and 80° C., and a pressure that may range from 1 to 10 atmospheres, preferably between 3 and 7 atmospheres, for a time that may range from 30 minutes to 8 hours, preferably between 1 and 5 hours and then the products are obtained in the conditions specified above, i.e., ethylene homopolymers and ethylene copolymers with α-olefin, with high molecular weight, such as HMWPE and UHMWPE, with broad MWD.

DETAILED DESCRIPTION OF THE PREFERRED MODALITIES

Along the present report, the terms below have the following meaning:
HDPE: high density polyethylene
HMWPE: high molecular weight ethylene homopolymer or copolymer
UHMWPE: ultra-high molecular weight ethylene homopolymer or copolymer
LLDPE: linear low density polyethylene
TEAL: triethylaluminum
TMAL: trimethylaluminum
TIBAL: triisobuthylauminum
TNHAL: tri-n-hexilaluminum
DEAC: diethylaluminum chloride
THF: tetrahydrofuran
Cp: cyclopentadienyl ligand
Ind: indenyl ligand
Flu: fluorenyl ligand
Me: methyl group
nBu: n-butyl group
Ti content: amount, in % wt, of titanium in the supported metallocene catalyst, determined by colorimetric analysis in an ultraviolet spectrometer Cary 100 from Varian.
Hf content: amount, in % wt, of hafnium in the supported metallocene catalyst, determined by X-Ray Fluorescence using a spectrometer from Bruker model S4.
Mg content: percent, in % wt, of magnesium in the catalytic support or supported metallocene catalyst, determined by atomic absorption spectroscopy using a Spectraa 110 spectrometer from Varian.
Al content: amount, in % wt, of aluminum in the catalytic support or supported metallocene catalyst, determined by atomic absorption spectroscopy using a Spectraa 110 spectrometer from Varian.
Cl content: amount, in % wt, of chlorine in the supported metallocene catalyst, determined by titration.
THF content: amount, in % wt, of tetrahydrofuran on catalytic support or supported metallocene catalyst, measured by gas chromatography in a CP 6800 equipment from Varian.
Al/M: molar ratio between aluminum and transition metal of the groups 4 or 5 of the Periodic Table of the supported metallocene catalyst molar ratio.
Al/THF: molar ratio between aluminum and tetrahydrofuran of the catalytic support.
A: catalytic activity of the ethylene homopolymerization and ethylene copolymerization with α-olefins, in Kg PE/g catalyst.
$V_{C4}$=: volume, in mL, of butene-1 added to the reactor for ethylene copolymerization.
$V_{Cn}$=: volume, in mL, of α-olefin added to the reactor for ethylene copolymerization, where n can range from 3 to12.
$D_{50}$: median particle diameter of the catalytic support or supported metallocene catalysts, determined according to a method based in the principle of optical diffraction of monochromatic laser light, using a Mastersizer 2000 apparatus.
TFP: represents the amount of fines, in % wt, in the polymer by the method for sieving where this content is measured from equation 1, as follows:

$$TFP=MFG\times 100/MA \qquad \text{Equation 1}$$

where,
MFG=mass of fines retained on a 120 sieve and background;
MA=total mass of the polymer sample;
100=conversion factor.
B.D.: represents polymer bulk density, in g/cm³, measured by the method ASTM D-1895.
TE: represents the flowing time, in seconds (s), of the polymers determined from the method that consists in leaving the sample to flow by gravity effect through a funnel with defined dimensions and measure the total time for flowing.
P.D.: represents density in the molded, in g/cm³, and measured by the method ASTM D-792.
$T_{m2}$: represents the melting temperature, in ° C., of the polymer determined by Differential Scanning calorimeter performed in equipment Thermal Analysis Instruments DSC-2010.
η: represents polymer intrinsic viscosity, in dL/g, determined by ASTM D-4020.
Mv: represents polymer viscosimetric molecular weight calculated by Margolies equation contained in ASTM D-4020.
MWD: represents the polymer molecular weight distribution (Mw/Mn), determined from GPC curve performed in an equipment Waters GPC 150C equipped with refraction index detector.

$C_n^=$: represents percent in weight (% wt), of α-olefin linked to the polymer chain, determined by $^{13}C$ NMR, where n can range from 3 to 12 and represents the number of carbons present in α-olefin.

As used in this patent, in reference to the Periodic Table of Elements, the new numeration scheme of the Periodic Table is used as in the reference CRC HANDBOOK OF CHEMISTRY AND PHYSICS (David R. Lide ed., CRC Press 81.sup.st ed. 2000).

The invention relates to a process for the preparation of supported bimetallic catalysts obtained from mixture of two supported transition metals in a catalytic support and an activator based on organometallic compounds of the groups 2 or 13 of the Periodic Table and that are not aluminoxane or organoboron compounds, where the first transition metal compound is preferably a transition metal complex of the groups 4 or 5 of Periodic Table containing ligands like monocyclopentadienyl, monoindenyl or monofluorenyl types, substituted or not, and the second transition metal compound is preferably a transition metal complex of the groups 4 or 5 of the Periodic Table containing ligands like halocarbon, alkyl, alkoxy types or monocyclopentadienyl, monoindenyl or monofluorenyl groups, substituted or not, the application in ethylene homopolymerization and ethylene copolymerization reactions with α-olefins and the ethylene homopolymers and ethylene copolymers with α-olefins, with high molecular weight produced this way as HMWPE and UHMWPE.

The process to obtain supported bimetallic catalysts of the present invention involves the reaction between (1) catalytic support and (2) reaction product between 2 transition metals where the first transition metal compound is preferably a transition metal complex of the groups 4 or 5 of the Periodic Table containing ligands like monocyclopentadienyl, monoindenyl or monofluorenyl type, substituted or not, and the second transition metal compound is preferably a transition metal complex of the groups 4 or 5 of the Periodic Table containing ligands like halocarbon, alkyl, alkoxy types or monocyclopentadienyl, monoindenyl or monofluorenyl groups, substituted or not and (3) an activator based on organometallic compounds of the groups 2 or 13 of the Periodic Table and that are not aluminoxane or organoboron compounds.

The process of the present invention of preparation of the catalytic support comprised the following steps:
a) Impregnation of a silica, thermally activated, using a solution of organometallic compound of the groups 2 or 13 of the Periodic Table, in an inert organic solvent;
b) Preparation of a solution of one or more magnesium-based compounds with a polar solvent;
c) Impregnation of the silica obtained in (a) using the prepared solution in (b);
d) Removal of the polar solvent by vacuum,
e) Reaction of the solid obtained in (d) with a solution of one or more organometallic compounds of the groups 2 or 13 of the Periodic Table, in an inert organic solvent.

The process of the present invention of preparation of supported bimetallic catalysts comprised the following steps:
f) Reaction of a first transition metal complex of the groups 4 or 5 of the Periodic Table containing ligands like monocyclopentadienyl, monoindenyl or monofluorenyl type, substituted or not, with a second transition metal compound of the groups 4 or 5 of the Periodic Table containing ligands like halocarbon, alkyl, alkoxy types or monocyclopentadienyl, monoindenyl or monofluorenyl groups, substituted or not, in an inert organic solvent;
g) Reaction of the solid product obtained in (f) with the solution of one or more organometallic compounds of the groups 2 or 13 of the Periodic Table in an inert organic solvent;
h) Reaction of the solid product obtained in (e) with the product in solution obtained in (g);
i) Optionally, reaction between the solid obtained in (h) with a halogenation agent.

In step (a) of the process for preparation of the catalytic support of the present invention, the preferable support used was silica and this is microspheroidal and presents the following characteristics: median particle diameter ($D_{50}$) between 0.5 and 80 μm, preferably between 1 and 60 μm, a superficial area between 50 and 500 $m^2/g$, preferably between 100 and 300 $m^2/g$, a volume of pores between 1.0 and 2.0 ml/g, preferably between 1.5 and 1.8 ml/g, an average diameter of pores between 10 and 40 nm, preferably between 20 and 30 nm. This silica must undergo a thermal treatment before its use in the preparation of the catalytic support. Such treatment must be performed in inerted atmosphere, at a temperature ranging from 100 to 800° C., for a period of 1 to 20 h. After this thermal treatment, the remaining content of OH groups in the silica surface is ranging from 0.1 to 2 mmoles OH per g of silica, preferably between 0.5 and 1.5 mmoles per g of silica.

In the step (a) of the process for preparation of the catalytic support of the present invention, the impregnation of silica is preferably performed suspending the silica, previously thermally treated, in a proportion ranging between 10 and 20 parts per weight for each 100 parts in volume of the solution of organometallic compound of the groups 2 or 13 of the Periodic Table, in an inert organic solvent, and keeping under stirring at a temperature that may range between the room temperature and boiling temperature of the solution of organometallic compound of the groups 2 or 13 of the Periodic Table, in inert organic solvent, preferably between 25° C. and 60° C., for a period from 30 to 120 minutes, preferably between 50 and 70 minutes.

The organometallic compounds of groups 2 or 13 of the Periodic Table most appropriate for use in the step (a) are alkylakuninum compounds and alkylaluminum halocarbons. Specific examples of such compounds are trimethylaluminum (TMAL), triethylaluminum (TEAL), tri-isobutilaluminum (TIBAL), tri-n-hexilaluminunl (TNHAL), tri-n-octilaluminum (TNOAL), dimethylalurninum chloride (DMAC), methytaluminum dichloride (MADC), diethylaluminum chloride (DEAC), ethylaluminum dichloride (EADC), di-isobutylaliminum chloride (DIBAC), isobutylaluminum dichloride (MONIBAC), n-butylethylmagnesium (BEM) and di-n-hexylmagnesium (DNHM). These compounds can be used concentrated or preferabiy dissolved in an organic solvent of the aliphatic hydrocarbon type.

Aliphatic hydrocarbons used as solvents to prepare the solution of organometallic compound of the groups 2 or 13 of the Periodic Table can present between 4 and 50 carbons, preferably between 6 and 20 carbons. Specific examples of these aliphatic hydrocarbons used as solvents are n-hexane, n-heptane, isopentane, n-octane, isoparaffin and more preferably n-hexane, isopentane and n-heptane.

In the step (a) of the process for preparation of the catalytic support of the present invention, the step of impregnation of the solution of organometallic compound of the groups 2 or 13 of the Periodic Table, in an inert organic solvent, is performed using a quantity of organometallic compound in a range from 0.01 to 1 mmol of the metal belonging to the groups 2 or 13 of the Periodic Table per mol of groups OH present in the silica surface, preferably between 0.1 and 0.7 mmol of the metal belonging to the groups 2 or 13 of the Periodic Table per mol of groups OH present in the silica surface.

In the end of the step of impregnation of silica with the solution of organometallic compound of the groups 2 or 13 of the Periodic Table, in an inert organic solvent, the treated silica can be recovered after removal of liquid present in the step (a) by different usual methods such as decantation and siphonation, filtration and vacuum removal. The operation temperature in this step can vary between room temperature and boiling temperature of the aliphatic hydrocarbon used as solvent, preferably at room temperature. The dried silica is used directly in the following step.

According to the present invention, in the step (b) of the process, a liquid compound is obtained from the solubilization of, at least, a magnesium-based compound, selected among magnesium halocarbon, magnesium alkoxy halocarbon, magnesium alkyl halocarbon, magnesium dialkyl and magnesium dialkoxy and a polar solvent. Generally, it is necessary to heat the mixture of these compounds up to a temperature ranging from 25° to 150° C., preferably between 40° and 100° C., for a period from 0.5 to 10 hours, preferably between 1 and 5 hours. The solution containing the mentioned compounds needs to be prepared under turbulent stirring and under inert conditions.

The most appropriate magnesium-based compound, selected among magnesium halocarbon, magnesium alkoxy halocarbon, magnesium alkyl halocarbon, magnesium dialkyl and magnesium dialkoxy to be used in the step b) are magnesium dichloride ($MgCl_2$), magnesium ethoxy chloride ($Mg(OCH_2CH_3)Cl$), magnesium ethyl chloride ($Mg(CH_2CH_3)Cl$), diethyl magnesium ($Mg(CH_2CH_3)_2$), diethoxy magnesium ($Mg(OCH_2CH_3)_2$). Magnesium dichloride, $MgCl_2$, is preferably used.

The most appropriate polar solvents for the solubilization of, at least, a magnesium-based compound, selected among magnesium halocarbon, magnesium alkoxy halocarbon, magnesium alkyl halocarbon, magnesium dialkyl and magnesium dialkoxy and magnesium dialkoxy of the step (b) are selected among ethers, alcohols and ketones. Specific examples of these polar solvents are ethyl ether, tetrahydrofuran, ethyl alcohol and ketone methylethyl, more preferably ethyl alcohol and tetrahydrofuran.

The quantity of magnesium-based compound used in the preparation of the described solution in the step (b) corresponds to a range of 0.002 to 0.2 g of magnesium compound per g of silica.

In the step (c), the silica obtained in step (a) is put in contact with the solution obtained in the step (b). The impregnation that happens in this step is performed suspending 10 to 20 parts per silica weight, obtained in the step (a), for each 100 parts per volume of solution obtained in the step (b). The suspension is kept under stirring at a temperature ranging from room temperature to the boiling temperature of the polar solvent used in the step (b), preferably between 50° C. and 100 ° C., for a period of 30 to 300 minutes, preferably between 60 and 240 minutes. After this period, the polar solvent used in the solution of the step (b) is removed per vacuum in the step (d). The remaining polar solvent in the solid obtained in (d) after the use of the vacuum must remain between 7 and 15% wt, preferably between 8 and 12% wt.

In the step (e) of the process for preparation of the catalytic support of the present invention, the solid obtained in (d) is suspended in an inert organic solvent such as hexane or heptane, and this is put in contact with one or more organometallic compounds of the groups 2 or 13 of the Periodic Table, in order to remove the content of remaining polar solvent in the solid. The molar ratio between organometallic compound of the groups 2 or 13 of the Periodic Table, and the remaining polar solvent in the solid, ranges between 0.1 and 3, preferably between 0.3 and 1.5. The reaction between the organometallic compounds of the groups 2 or 13 of the Periodic Table and the remaining polar solvent in the solid happens under stirring at a temperature that may range between the room temperature and boiling temperature of the solution of organometallic compounds of the groups 2 or 13 of the Periodic Table, in inert organic solvent, preferably between 25° C. and 60° C., for a period of 30 to 300 minutes, preferably between 50 and 120 minutes.

The most appropriate organometallic compounds of groups 2 or 13 of the Periodic Table to be used in the step e) are alkylaiummum compounds and alkyls halocarbons. Specific examples of such compounds are trimethylaluminum (TMAL), triethylaluminum (TEAL), tri-isobutylaluminum (TIBAL), tri-n-hexilaluninum (TNHAL), tri-n-octilauminum (TNOAL), dimethylaluminum chloride (DMAC), methylaluminum dichloride (MADC), diethylaluminum chloride (DEAC), ethylaluminum dichloride (EADC), di-isobutylaluminum chloride (DIBAC), isobutylaluminum dichloride (MONIBAC), ethylmagnesium butyl (BEM), octilmaeuesium butyl (BOMAG), methylmagnesium chloride and ethylmagnesium chloride. These compounds can be used concentrated or preferably dissolved in an organic solvent of the aliphatic hydrocarbon type.

When using more than one organometallic compound of the groups 2 or 13 of the Periodic Table in the step (e), the different compounds can be fed in the same solution or in separate solutions, at the same time or in subsequent additions.

The catalytic support of the present invention obtained at the end of the step (e) can present in its composition a remaining content of polar solvent that can range between 1 and 8% wt.

In the step (f) of the process for preparation of the supported bimetallic catalysts, the first transition metal compound of the groups 4 or 5 of the Periodic Table containing ligands like monocyclopentadienyl, monoindenyl or monofluorenyl type, substituted or not, is put in contact with the second transition metal of the groups 4 or 5 of the Periodic Table containing ligands like halocarbon, alkyl, alkoxy, or monocyclopentadienyl, monoindenyl or monofluorenyl groups, substituted or not, using, as reaction medium, an inert organic solvent of the aliphatic or aromatic hydrocarbon type, preferably aliphatic. The mixture is put under stirring at a temperature ranging from the room temperature to the boiling temperature of the organic solvent used, preferably between 30° and 150° C.

The first transition metal compound used for this purpose is compound of the groups 4 or 5 of the Periodic Table, preferably of the group 4, such as, for example, Ti, Zr and Hf. Such complexes present organic ligands like monocyclopentadienyl, monoindenyl or monofluorenyl type, which can be substituted or not, i.e., such groups are mononuclear aromatic rings that are linked to the transition metal by π bond. Other ligands can be linked to the transition metal such as, halogens and alkoxy groups, preferably chlorides and methoxy, respectively.

The first transition metal compound of the groups 4 or 5 of the Periodic Table containing ligands like monocyclopentadienyl, monoindenyl or monofluorenyl type, substituted or not, used in the present invention is derived from a formula compound 1:

[L]-MQ$_3$  formula 1 where,

M is a transition metal of the groups 4 or 5;

Q, which can be equal or different, is a halogen radical, aryl radical, alkyl radical containing between 1 and 5 carbon atoms or alkoxy radical containing between 1 and 5 carbon atoms;

L is a bulky ligand of the cyclopentadienyl, indenyl or fluorenyl type, substituted or not by hydrogen, alkyl, cycloalkyl, aryl, alkenyl, alkylaryl, arylalkyl or arylalkenyl, linked to the transition metal by π bond.

According to examples incorporated to the present invention, examples representing, but not limiting, the compounds having the formula 1 include CpTiCl$_3$, CpZrCl$_3$, CpHfCl$_3$, CpVCl$_3$, CpTi(Me)$_3$, CpZr(Me)$_3$, CpHf(Me)$_3$, CpTi(OMe)$_3$, CpZr(OMe)$_3$, CpHf(OMe)$_3$, CpTi(OEt)$_3$, CpZr(OEt)$_3$, CpHf(OEt)$_3$, IndTiCl$_3$, IndZrCl$_3$, IndHfCl$_3$, IndVCl$_3$, IndTi(Me)$_3$, IndZr(Me)$_3$, IndHf(Me)$_3$, IndTi(Me)$_3$, IndZr(OMe)$_3$, IndHf(OMe)$_3$, IndTi(OEt)$_3$, IndZr(OEt)$_3$, IndHf(OEt)$_3$, FluTiCl$_3$, FluZrCl$_3$, FluHfCl$_3$, FluVCl$_3$, FluTi(Me)$_3$, FluZr(Me)$_3$, FluHf(Me)$_3$, FluTi(OMe)$_3$, FluZr(OMe)$_3$, FluHf(OMe)$_3$, FluTi(OEt)$_3$, FluZr(OEt)$_3$, FluHf(OEt)$_3$, (MeCp)TiCl$_3$, (MeCp)ZrCl$_3$, (MeCp)HfCl$_3$, (MeCp)VCl$_3$, (MeCp)Ti(Me)$_3$, (MeCp)Zr(Me)$_3$, (MeCp)Hf(Me)$_3$, (MeCp)Ti(OMe)$_3$, (MeCp)Zr(OMe)$_3$, (MeCp)Hf(OMe)$_3$, (MeCp)Ti(OEt)$_3$, (MeCp)Zr(OEt)$_3$, (MeCp)Hf(OEt)$_3$, (nBuCp)TiCl$_3$, (nBuCp)ZrCl$_3$, (nBuCp)HfCl$_3$, (nBuCp)VCl$_3$, (nBuCp)Ti(Me)$_3$, (nBuCp)Zr(Me)$_3$, (nBuCp)Hf(Me)$_3$, (nBuCp)Ti(OCH$_3$)$_3$, (nBuCp)Zr(OCH$_3$)$_3$, (nBuCp)Hf(OCH$_3$)$_3$, (nBuCp)Ti(OEt)$_3$, (nBuCp)Zr(OEt)$_3$, (nBuCp)Hf(OEt)$_3$, (Me$_5$Cp)TiCl$_3$, (Me$_5$Cp)ZrCl$_3$, (Me$_5$Cp)HfCl$_3$, (Me$_5$Cp)VCl$_3$, (Me$_5$Cp)Ti(Me)$_3$, (Me$_5$Cp)Zr(Me)$_3$, (Me$_5$Cp)Hf(Me)$_3$, (Me$_5$Cp)Ti(OMe)$_3$, (Me$_5$Cp)Zr(OMe)$_3$, (Me$_5$Cp)Hf(OMe)$_3$, (Me$_5$Cp)Ti(OEt)$_3$, (Me$_5$Cp)Zr(OEt)$_3$, (Me$_5$Cp)Hf(OEt)$_3$, (4,7-Me$_2$Ind)TiCl$_3$, (4,7-Me$_2$Ind)ZrCl$_3$, (4,7-Me$_2$Ind)HfCl$_3$, (4,7-Me$_2$Ind)VCl$_3$, (4,7-Me$_2$Ind)Ti(Me)$_3$, (4,7-Me$_2$Ind)Zr(Me)$_3$, (4,7-Me$_2$Ind)Hf(Me)$_3$, (4,7-Me$_2$Ind)Ti(OMe)$_3$, (4,7-Me$_2$Ind)Zr(OMe)$_3$, (4,7-Me$_2$Ind)Hf(OMe)$_3$, (4,7-Me$_2$Ind)Ti(OEt)$_3$, (4,7-Me$_2$Ind)Zr(OEt)$_3$, (4,7-Me$_2$Ind)Hf(OCH$_2$CH$_3$)$_3$, (2-MeInd)TiCl$_3$, (2-MeInd)ZrCl$_3$, (2-MeInd)HfCl$_3$, (2-MeInd)VCl$_3$, (2-MeInd)Ti(Me)$_3$, (2-MeInd)Zr(Me)$_3$, (2-MeInd)Hf(Me)$_3$, (2-MeInd)Ti(OMe)$_3$, (2-MeInd)Zr(OMe)$_3$, (2-MeInd)Hf(OMe)$_3$, (2-MeInd)Ti(OEt)$_3$, (2-MeInd)Zr(OEt)$_3$, (2-MeInd)Hf(OEt)$_3$, (2-arilInd)TiCl$_3$, (2-arilInd)ZrCl$_3$, (2-arilInd)HfCl$_3$, (2-arilInd)VCl$_3$, (2-arilInd)Ti(Me)$_3$, (2-arilInd)Zr(Me)$_3$, (2-arilInd)Hf(Me)$_3$, (2-arilInd)Ti(OMe)$_3$, (2-arilInd)Zr(OMe)$_3$, (2-arilInd)Hf(OMe)$_3$, (2-arilInd)Ti(OEt)$_3$, (2-arilInd)Zr(OEt)$_3$, (2-arilInd)Hf(OEt)$_3$, (4,5,6,7-H$_4$Ind)TiCl$_3$, (4,5,6,7-H$_4$Ind)ZrCl$_3$, (4,5,6,7-H$_4$Ind)HfCl$_3$, (4,5,6,7-H$_4$Ind)VCl$_3$, (4,5,6,7-H$_4$Ind)Ti(Me)$_3$, (4,5,6,7-H$_4$Ind)Zr(Me)$_3$, (4,5,6,7-H$_4$Ind)Hf(Me)$_3$, (4,5,6,7-H$_4$Ind)Ti(OMe)$_3$, (4,5,6,7-H$_4$Ind)Zr(OMe)$_3$, (4,5,6,7-H$_4$Ind)Hf(OMe)$_3$, (4,5,6,7-H$_4$Ind)Ti(OEt)$_3$, (4,5,6,7-H$_4$Ind)Zr(OEt)$_3$, (4,5,6,7-H$_4$Ind)Hf(OEt)$_3$, (9-MeFlu)TiCl$_3$, (9-MeFlu)ZrCl$_3$, (9-MeFlu)HfCl$_3$, (9-MeFlu)VCl$_3$, (9-MeFlu)Ti(Me)$_3$, (9-MeFlu)Zr(Me)$_3$, (9-MeFlu)Hf(Me)$_3$, (9-MeFlu)Ti(OMe)$_3$, (9-MeFlu)Zr(OMe)$_3$, (9-MeFlu)Hf(OMe)$_3$, (9-MeFlu)Ti(OEt)$_3$, (9-MeFlu)Zr(OEt)$_3$, (9-MeFlu)Hf(OEt)$_3$.

The second transition metal compound used for this preparation is compound of the groups 4 or 5 of the Periodic Table, preferably of the group 4, such as, for example, Ti, Zr and Hf. Such complexes present organic ligands like halocarbon, alkyl, alkoxy or monocyclopentadienyl, monoindenyl or monofluorenyl groups, substituted or not, i.e., such groups are mononuclear aromatic rings that are linked to the transition metal by π bond.

The second transition metal compound of the groups 4 or 5 of the Periodic Table containing ligands like halocarbon, alkyl, alkoxy type or monocyclopentadienyl, monoindenyl or monofluorenyl groups, substituted or not, used in the present invention is derived from the formula 2 compound:

[L]-MQ$_3$  formula 2 where,

M is a transition metal of the groups 4 or 5;

Q, which can be equal or different, is a halogen radical, aryl radical, alkyl radical containing between 1 and 5 carbon atoms or alkoxy radical containing between 1 and 5 carbon atoms;

L' is an organic ligand that can be a halocarbon, an alkyl, an alkoxy or a bulky ligand of the cyclopentadienyl, indenyl or fluorenyl type, substituted or not by hydrogen, alkyl, cycloalkyl, aryl, alkenyl, alkylaryl, arylalkyl or arylalkenyl, linked to the transition metal by π bond.

According to examples incorporated to the present invention, examples representing, but not limiting, the compounds having the formula 2 include TiCl$_4$, TiBr$_4$, Ti(OnBu)$_4$, Ti(OiPr)$_4$, Ti(OMe)$_4$, Ti(OBu)$_2$Cl$_2$, Ti(OiPr)$_2$Cl$_2$, Ti(OMe)$_2$Cl$_2$, Zr(OnBu)$_4$, Zr(OiPr)$_4$, Zr(OMe)$_4$, Zr(OnBu)$_2$Cl$_2$, Zr(OiPr)$_2$Cl$_2$, Zr(OMe)$_2$Cl$_2$, CpTiCl3, CpZrCl$_3$, CpHfCl$_3$, CpVCl$_3$, CpTi(Me)$_3$, CpZr(Me)$_3$, CpHf(Me)$_3$, CpTi(OMe)$_3$, CpZr(OMe)$_3$, CpHf(OMe)$_3$, CpTi(OEt)$_3$, CpZr(OEt)$_3$, CpHf(OEt)$_3$, IndTiCl$_3$, IndZrCl$_3$, IndHfCl$_3$, IndVCl$_3$, IndTi(Me)$_3$, IndZr(Me)$_3$, IndHf(Me)$_3$, IndTi(Me)$_3$, IndZr(OMe)$_3$, IndHf(OMe)$_3$, IndTi(OEt)$_3$, IndZr(OEt)$_3$, IndHf(OEt)$_3$, FluTiCl$_3$, FluZrCl$_3$, FluHfCl$_3$, FluVCl$_3$, FluTi(Me)$_3$, FluZr(Me)$_3$, FluHf(Me)$_3$, FluTi(OMe)$_3$, FluZr(OMe)$_3$, FluHf(OMe)$_3$, FluTi(OEt)$_3$, FluZr(OEt)$_3$, FluHf(OEt)$_3$, (MeCp)TiCl$_3$, (MeCp)ZrCl$_3$, (MeCp)HfCl$_3$, (MeCp)VCl$_3$, (MeCp)Ti(Me)$_3$, (MeCp)Zr(Me)$_3$, (MeCp)Hf(Me)$_3$, (MeCp)Ti(OMe)$_3$, (MeCp)Zr(OMe)$_3$, (MeCp)Hf(OMe)$_3$, (MeCp)Ti(OEt)$_3$, (MeCp)Zr(OEt)$_3$, (MeCp)Hf(OEt)$_3$, (nBuCp)TiCl$_3$, (nBuCp)ZrCl$_3$, (nBuCp)HfCl$_3$, (nBuCp)VCl$_3$, (nBuCp)Ti(Me)$_3$, (nBuCp)Zr(Me)$_3$, (nBuCp)Hf(Me)$_3$, (nBuCp)Ti(OCH$_3$)$_3$, (nBuCp)Zr(OCH$_3$)$_3$, (nBuCp)Hf(OCH$_3$)$_3$, (nBuCp)Ti(OEt)$_3$, (nBuCp)Zr(OEt)$_3$, (nBuCp)Hf(OEt)$_3$, (Me$_5$Cp)TiCl$_3$, (Me$_5$Cp)ZrCl$_3$, (Me$_5$Cp)HfCl$_3$, (Me$_5$Cp)VCl$_3$, (Me$_5$Cp)Ti(Me)$_3$, (Me$_5$Cp)Zr(Me)$_3$, (Me$_5$Cp)Hf(Me)$_3$, (Me$_5$Cp)Ti(OMe)$_3$, (Me$_5$Cp)Zr(OMe)$_3$, (Me$_5$Cp)Hf(OMe)$_3$, (Me$_5$Cp)Ti(OEt)$_3$, (Me$_5$Cp)Zr(OEt)$_3$, (Me$_5$Cp)Hf(OEt)$_3$, (4,7-Me$_2$Ind)TiCl$_3$, (4,7-Me$_2$Ind)ZrCl$_3$, (4,7-Me$_2$Ind)HfCl$_3$, (4,7-Me$_2$Ind)VCl$_3$, (4,7-Me$_2$Ind)Ti(Me)$_3$, (4,7-Me$_2$Ind)Zr(Me)$_3$, (4,7-Me$_2$Ind)Hf(Me)$_3$, (4,7-Me$_2$Ind)Ti(OMe)$_3$, (4,7-Me$_2$Ind)Zr(OMe)$_3$, (4,7-Me$_2$Ind)Hf(OMe)$_3$, (4,7-Me$_2$Ind)Ti(OEt)$_3$, (4,7-Me$_2$Ind)Zr(OEt)$_3$, (4,7-Me$_2$Ind)Hf(OCH$_2$CH$_3$)$_3$, (2-MeInd)TiCl$_3$, (2-MeInd)ZrCl$_3$, (2-MeInd)HfCl$_3$, (2-MeInd)VCl$_3$, (2-MeInd)Ti(Me)$_3$, (2-MeInd)Zr(Me)$_3$, (2-MeInd)Hf(Me)$_3$, (2-MeInd)Ti(OMe)$_3$, (2-MeInd)Zr(OMe)$_3$, (2-MeInd)Hf(OMe)$_3$, (2-MeInd)Ti(OEt)$_3$, (2-MeInd)Zr(OEt)$_3$, (2-MeInd)Hf(OEt)$_3$, (2-arilInd)TiCl$_3$, (2-arilInd)ZrCl$_3$, (2-arilInd)HfCl$_3$, (2-arilInd)VCl$_3$, (2-arilInd)Ti(Me)$_3$, (2-arilInd)Zr(Me)$_3$, (2-arilInd)Hf(Me)$_3$, (2-arilInd)Ti(OMe)$_3$, (2-arilInd)Zr(OMe)$_3$, (2-arilInd)Hf(OMe)$_3$, (2-arilInd)Ti(OEt)$_3$, (2-arilInd)Zr(OEt)$_3$, (2-arilInd)Hf(OEt)$_3$, (4,5,6,7-H$_4$Ind)TiCl$_3$, (4,5,6,7-H$_4$Ind)ZrCl$_3$, (4,5,6,7-H$_4$Ind)HfCl$_3$, (4,5,6,7-H$_4$Ind)VCl$_3$, (4,5,6,7-H$_4$Ind)Ti(Me)$_3$, (4,5,6,7-H$_4$Ind)Zr(Me)$_3$, (4,5,6,7-H$_4$Ind)Hf(Me)$_3$, (4,5,6,7-H$_4$Ind)Ti(OMe)$_3$, (4,5,6,7-H$_4$Ind)Zr(OMe)$_3$, (4,5,6,7-H$_4$Ind)Hf(OMe)$_3$, (4,5,6,7-H$_4$Ind)Ti(OEt)$_3$, (4,5,6,7-H$_4$Ind)Zr(OEt)$_3$, (4,5,6,7-H$_4$Ind)Hf(OEt)$_3$, (9-MeFlu)

TiCl$_3$, (9-MeFlu)ZrCl$_3$, (9-MeFlu)HfCl$_3$, (9-MeFlu)VCl$_3$, (9-MeFlu)Ti(Me)$_3$, (9-MeFlu)Zr(Me)$_3$, (9-MeFlu)Hf(Me)$_3$, (9-MeFlu)Ti(OMe)$_3$, (9-MeFlu)Zr(OMe)$_3$, (9-MeFlu)Hf(OMe)$_3$, (9-MeFlu)Ti(OEt)$_3$, (9-MeFlu)Zr(OEt)$_3$, (9-MeFlu)Hf(OEt)$_3$.

The most appropriate organic solvents of the aliphatic hydrocarbon type to suspend or solubilize the transition metal complex of the groups 4 or 5 of the Periodic Table used in the preparation process of the supported bimetallic catalysts are n-hexane, n-heptane, isopentane, n-octane, isoparaffin and more preferably are n-hexane, isopentane and n-heptane.

In the step (f) of the process for preparation of the supported bimetallic catalysts of the present invention, the first transition metal compound of the groups 4 or 5 of the Periodic Table containing ligands like monocyclopentadienyl, monoindenyl or monofluorenyl type, substituted or not, is not put in contact with the second transition metal compound of the groups 4 or 5 of the Periodic Table containing ligands like halocarbon, alkyl, alkoxy type or monocyclopentadienyl, monoindenyl or monofluorenyl groups, substituted or not, in a molar ratio between the transition metals ranging between 0.1 and 4, preferably between 0.3 and 2, in an inert organic solvent, and keeping under stirring at a temperature that may range from room temperature to boiling temperature of the inert organic solvent, preferably between 25° C. and 60° C., for a period of 30 to 150 minutes, preferably between 50 and 120 minutes.

In the step g), the solid product between 2 transition metal products obtained in (f) is reacted with the solution of one or more organometallic compounds of the groups 2 or 13 of the Periodic Table, in an inert organic solvent at a temperature that may range from room temperature to the boiling temperature of the organic solvent used, preferably between 30° and 150° C., for a period from 30 to 300 minutes, preferably between 50 and 120 minutes.

The amount of transition metal complex of the groups 2 or 13 of the Periodic Table, in relation to the total amount of the transition metal corresponding to the compound containing ligands like monocyclopentadienyl, monoindenyl or monofluorenyl type, substituted or not, corresponds to a molar ratio ranging from 0.5 to 5, preferably between 1 and 4.

The total amount of transition metal complex of the groups 4 or 5 of the Periodic Table containing ligands like monocyclopentadienyl, monoindenyl or monofluorenyl type, substituted or not, used in the preparation of the solution obtained in (f) corresponds to a range from 0.5 to 4 of transition metal of the groups 4 or 5 of the Periodic Table per g of silica, preferably between 1 and 2.5 mmol of transition metal of the groups 4 or 5 of the Periodic Table per g of silica.

In the step (h), the solid product obtained in (e) is reacted with the product in solution obtained in the step (g) at a temperature ranging from the room temperature to the boiling temperature of the organic solvent used, preferably between 30° and 150° C., for a period from 30 to 300 minutes, preferably between 50 and 120 minutes.

Optionally, in the step (i), the solid obtained in (h) is put in contact with a halogenation agent. Useful halogenation agents for the practice of the present invention are preferably pure or diluted liquids in an inert organic solvent. Examples representing, but not limiting, the halogenation agents include dimethylaluminum chloride (DMAC), methylaluminum dichloride (MADC), diethylaluminum chloride (DEAC), ethylaluminum dichloride (EADC), di-isobutylaluminum chloride (DIBAC), isobutylaluminum dichloride (MONIBAC), aluminum ethyl sesquichioride (EASC), silicium tetrachloride (SiCl$_4$), tetrachloride tin (SnCl$_4$), trichlorosilan methyl (MeSiCl$_3$), dimethyl dichlorosilan (Me$_2$SiCl$_2$), titanium tetrachloride (TiCl$_4$), vanadium tetrachloride (VCl$_4$), carbon tetrachloride (CCl$_4$), t-butyl chloride, chloroform and dichloromethane.

The preferred halogenation agents are chlorination agents and among them, aluminum ethyl sesquichloride (EASC), silicium tetrachlroride (SiCl$_4$), tin tetrachloride (SnCl$_4$), chloroform and dichloromethane are preferred, more preferably the silicium tetrachloride (SiCl$_4$).

The amount of halogenation agent used optionally in the step (i) of the process, relative to the transition metal, corresponds to a molar ratio between 0.5 and 5, preferably between 1 and 3.

The required time for the halogenation of the transition metal complexes of the groups 4 or 5 of the Periodic Table containing alkoxy radicals ranges between 0.5 and 5 h, preferably between 1 and 3 h. The required temperature for the halogenation of the transition metal complexes of the groups 4 or 5 of the Periodic Table containing ligands like monocyclopentadienyl, monoindenyl or monofluorenyl type, substituted or not, and containing alkoxy radicals ranges between the room temperature and the boiling temperature of the inert organic solvent used, preferably between 30° and 100° C.

The solid product obtained in (h) or (i) is rinsed with an inert organic solvent, preferably hexane, and then dried. The washing temperature can vary between the room temperature and the boiling temperature of the inert organic solvent used, preferably between 30° and 150° C., for a period of 30 to 300 minutes, preferably between 50 and 120 minutes.

The distribution of particle sizes of the supported bimetallic catalysts based on the present invention is quite similar to the distribution of particle sizes of the silica used as support and, as a consequence, its median particle diameter ($D_{50}$) ranges between 0.5 and 80 μm.

The supported bimetallic catalysts of the present invention are proper to be used in process of ethylene homopolymerization and ethylene copolymerization with α-olefins in liquid or gas phases. More specifically, the supported bimetallic catalysts of the present invention are proper to be used in processes in bulk, slurry and gas phase.

The cocatalyst used in the process of ethylene homopolymerization and ethylene copolymerization with α-olefins, using the supported complex of the present invention, is an alkylaluminum, preferably TMAL, TEAL or TIBAL. The molar ratio Al/M in the process of ethylene homopolymerization and copolymerization ranges from 1:1 to 500:1.

An important aspect of the supported bimetallic catalyst of the present invention is its ability to produce, when submitted to the conditions of ethylene homopolymerization and ethylene copolymerization with α-olefins, particles of ethylene homopolymers and copolymers with α-olefins, with high molecular weight (HMWPE) and ethylene homopolymers and ethylene copolymers with α-olefins, with ultra-high molecular weight α-olefins (UHMWPE), with controlled morphology, i.e., spheroidal, presenting high bulk density (B.D.), i.e., ranging from 0.34 and 0.47 g/cm$^3$ and low TFP, i.e., between 0 and 0.3% p/p and good flow, i.e., TE ranging from 5 and 12 seconds. This way, the supported bimetallic catalysts can be fed directly to the polymerization reactor. Particular forms to feed the supported bimetallic catalysts to the polymerization reactor are powder, paste, in oil suspension or in suspension with solvent.

The supported bimetallic catalysts of the present invention are used with advantage in the ethylene homopolymerization and ethylene copolymerization with olefins such as, propene, butene-1, hexene-1, 4-methyl-pentene-1, octene-1 and dodecene-1. In particular, these supported bimetallic catalysts are used in the preparation of ethylene homopolymers and ethylene copolymers with α-olefins, with high molecular weight (HMWPE) and of homopolymers and copolymers with α-olefins, with ultra-high molecular weight (UHMWPE) with broad molecular weight distribution, i.e., MWD ranging from 4 to 15, preferably ranging from 4 to 8.

Ethylene homopolymers and copolymers with α-olefins, with high molecular weight (HMWPE) and the ethylene homopolymers and ethylene copolymers with α-olefins, with ultra-high molecular weight α-olefins (UHMWPE), with broad MWD, of the present invention present intrinsic viscosity ranging from 2 to 30 dL/g. More specifically, the ethylene homopolymers and copolymers with high molecular weight α-olefins
(HMWPE) and the ethylene homopolymers and ethylene copolymers with α-olefins, with ultra-high molecular weight (UHMWPE), with broad MWD, present intrinsic viscosity ranging from 4 to 28 dL/g.

The ethylene homopolymers and copolymers with α-olefins, with high molecular weight (PEAD-APM) and the ethylene homopolymers and ethylene copolymers with α-olefins, with ultra-high molecular weight α-olefins (PEUAPM), with broad MWD, of the present invention present My ranging from 200,000 to 10,000,000 g/mol. More specifically, the ethylene homopolymers and copolymers with α-olefins, with high molecular weight (HMWPE) and the ethylene homopolymers and ethylene copolymers with α-olefins, with ultra-high molecular weight α-olefins (UHMWPE), with broad MWD, present My ranging from 500,000 to 9,000,000 g/mol.

The ethylene homopolymers and copolymers with α-olefins, with high molecular weight (HMWPE) and the ethylene homopolymers and ethylene copolymers with α-olefins, with ultra-high molecular weight (UHMWPE), with broad MWD, of the present invention present push density ranging from 0.932 to 0.890 g/cm$^3$.

EXAMPLES

In the examples of the present invention, which must not be considered limiting, used transition metal complexes of the group 4 of the Periodic Table, such as, for example, CpTiCl$_3$ and IndTiCl$_3$ and organometallic compounds of the group 13 of the Periodic Table, such as TEAL, TMAL, TIBAL e DEAC, acquired from Akzo Nobel. The transition metal complex of the group 4 of the Periodic Table containing groups of the alkoxy type chosen was Ti(OBu)$_4$, purchased from Merck. The magnesium-based compound selected among magnesium halocarbons, was MgCl$_2$, acquired from Maruyasu Co. All reagents mentioned above were used as received. Tetrahydrofuran (THF) was acquired from Tedia Brazil and purified with metallic sodium for water removal and with nitrogen, for oxygen removal. Silica XPO-2402, and SYLOPOL 5550 were acquired from GRACE DAVISON and used as received.

In the examples related below, the organic solvent used, n-hexane, was acquired from Phillips Petroleum and purified with molecular sieve 3A and nitrogen, to remove water and oxygen, respectively. The organometallic compounds TEAL, TMAL, TIBAL and DEAC, were used in solution of n-hexane in a concentration ranging from 10 to 13% wt, depending on the organometallic compound used. All operations were performed using inert atmosphere of nitrogen with upper limit of 1.5 ppm of moisture.

Example 1 a) Preparation of the Catalytic Support

In a 5 L reactor equipped with mechanical stirring and previously purged with nitrogen, was added 44.5 g (0.462 mmol) of MgCl$_2$ and 2.5 L of dried THF. This mixture was heated until 60° C. and stirred at 100 rpm for 5 h for complete solubilization of the MgCl$_2$. The obtained solution was, after this period, cooled down to 35° C. In this solution, 300 g of silica XPO-2402 were added, previously dehydrated at 600° C. and treated with 22.3 ml (0.163 mmol) of diluted TEAL in n-hexane for 50 minutes at temperature of 25° C. Once finished the addition of silica, the mixture was heated up to 60° C. and stirred at 100 rpm for 1 h. After this period, we stop the stirring and start the THF evaporation through vacuum until the THF content to be incorporated in the support to reach a range between 8 and 12% p/p.

The catalytic support obtained was characterized, presenting the following characteristics:

THF Content: 11.2% wt
Mg Content: 2.3% wt
Al Content: 1.2% wt b) Preparation of the Supported Complex In one 1-L reactor equipped with mechanical stirring and previously purged with nitrogen, 6.3 g of the catalytic support prepared in the step a) and 50 mL of n-hexane were added. In this suspension, stirred at 100 rpm and the temperature of 25° C., it was slowly added 0.55 mL (4.4 mmol) of diluted DEAC diluted in n-hexane (Al/THF=0.45). The suspension was stirred for 2 h and after this period, the solvent was removed by siphonation. The catalytic support obtained, after this treatment, was characterized presenting the following characteristics:

THF Content: 3.4% wt

In a schlenk, equipped with magnetic stirrer and dipped in a heat oil bath, 0.62 g (2.83 mmol) of CpTiCl$_3$, 3 mL (8.82 mmol) of Ti(OBu)$_4$ and 30 mL of n-hexane were transferred. In this suspension heated up to 50° C. and under stirring, 1.44 mL (5.7 mmol) of diluted TIBAL in n-hexane (Al/CpTiCl$_3$=2) was slowly added. The dark solution obtained was stirred for 1 h at 50° C.

In the catalytic support obtained after the treatment with DEAC, 50 mL of n-hexane was again added and the suspension was heated up to 50° C. In this suspension stirred at 100 rpm, the dark solution obtained from the reaction between CpTiCl$_3$, Ti(OBu)$_4$ and TIBAL was slowly added and, after the addition was ended, the suspension was stirred at 100 rpm at 50° C. for 1 h. Elapsed this period, in the suspension, a diluted solution of 1.66 mL of SiCl$_4$ (14.5 mmol) was added in n-hexane. The reaction was kept at 50° C. under stirring for one extra hour and, then, the temperature was reduced to 30° C. The solid obtained was filtered and dried under fluidization with nitrogen.

The supported complex obtained was characterized, presenting the following characteristics:

THF Content: 2.0% wt
Ti Content: 2.4% wt
Mg Content: 2.2% wt
Al Content: 1.8% wt
Cl Content: 9.8% wt
D$_{50}$: 59 μm

Example 2 b) Preparation of the Supported Complex

In a 200-mL reactor equipped with mechanical stirring and previously purged with nitrogen, 3.1 g of the catalytic support prepared in the step (a) of the EXAMPLE 1 and 50 mL of n-hexane were added. In this suspension, stirred at 200 rpm and under temperature of 25° C., it was slowly added 0.54 mL (4.1 mmol) of diluted DEAC in n-hexane (Al/THF=0.45). The suspension was stirred for 2 h and, after this period, the solvent was removed by siphonation. The catalytic support obtained, after this treatment, was characterized presenting the following characteristics:

THF Content: 5.9% wt

In a schlenk, equipped with magnetic stirrer and dipped in a heat oil bath, 0.33 g (1.5 mmol) of $CpTiCl_3$, 1.63 mL (4.79 mmol) of $Ti(OBu)_4$ and 30 mL of n-hexane were transferred. In this suspension heated up to 50° C. and under stirring, 1.51 mL (5.95 mmol) of diluted TIBAL (Al/$CpTiCl_3$=4) in n-hexane was slowly added. The dark solution obtained was stirred for 1 h at 50° C.

In the catalytic support obtained after the treatment with DEAC, 50 mL of n-hexane was again added and the suspension was heated up to 50° C. In this suspension stirred at 100 rpm, the dark solution obtained from the reaction between $CpTiCl_3$, $Ti(OBu)_4$ and TIBAL was slowly added and, after the addition was ended, the suspension was stirred at 100 rpm at 50° C. for 1 h. Elapsed this period, in the suspension, a diluted solution of 0.91 mL of $SiCl_4$ (7.94 mmol) was added in n-hexane. The reaction was kept at 50° C. under stirring for one extra hour and, then, the temperature was reduced to 30° C. The solid obtained was filtered and dried under fluidization with nitrogen.

The supported complex obtained was characterized, presenting the following characteristics:

THF Content: 3.6% wt
Ti Content: 5.0% wt
Mg Content: 2.5% wt
Al Content: 3.2% wt
Cl Content: 12.3% wt
$D_{50}$: 60 μm

Example 3 b) Preparation of the Supported Complex

In a 200-mL reactor equipped with mechanical stirring and previously purged with nitrogen, 4.4 g of the catalytic support prepared in the step (a) of the EXAMPLE 1 and 50 mL of n-hexane were added. In this suspension, stirred at 200 rpm and the temperature of 25° C., it was slowly added 0.21 mL (2.2 mmol) of diluted TMAL in n-hexane (Al/THF=0.45). The suspension was stirred for 2 h and after this period, the solvent was removed by siphonation. The catalytic support obtained, after this treatment, was characterized presenting the following characteristics:

THF Content: 2.2% wt

In a schlenk, equipped with magnetic stirrer and dipped in a heat oil bath, 0.5 g (2.28 mmol) of $CpTiCl_3$, 0.8 mL (2.35 mmol) of $Ti(OBu)_4$ and 30 mL of n-hexane were transferred. In this suspension heated up to 50° C. and under stirring, 0.8 mL (3.15 mmol) of diluted TIBAL in n-hexane (Al/$CpTiCl_3$=4) was slowly added. The dark solution obtained was stirred for 1 h at 50° C.

In the catalytic support obtained after the treatment with TMAL, 50 mL of n-hexane was again added and the suspension was heated up to 50° C. In this suspension stirred at 100 rpm, the dark solution obtained from the reaction between $CpTiCl_3$, $Ti(OBu)_4$ and TIBAL was slowly added and, after the addition was ended, the suspension was stirred at 100 rpm at 50° C. for 1 h. Elapsed this period, in the suspension, a diluted solution of 0.45 mL of $SiCl_4$ (3.9 mmol) was added in n-hexane. The reaction was kept at 50° C. under stirring for one extra hour and, then, the temperature was reduced to 30° C. The solid obtained was filtered and dried under fluidization with nitrogen.

The supported complex obtained was characterized, presenting the following characteristics:

THF Content: 1.8% wt
Ti Content: 1.7% wt
Mg Content: 2.1% wt
Al Content: 2.7% wt
Cl Content: 8.8% wt
$D_{50}$: 59 μm

Example 4 b) Preparation of the Supported Complex

In a 200-mL reactor equipped with mechanical stirring and previously purged with nitrogen, 4.1 g of the catalytic support prepared in the step (a) of the EXAMPLE 1 and 50 mL of n-hexane were added. In this suspension, stirred at 200 rpm and the temperature of 25° C., it was slowly added 0.28 mL (2.9 mmol) of diluted TMAL in n-hexane (Al/THF=0.45). The suspension was stirred for 2 h and after this period, the solvent was removed by siphonation. The catalytic support obtained, after this treatment, was characterized presenting the following characteristics:

THF Content: 3.0% wt

In a schlenk, equipped with magnetic stirrer and dipped in a heat oil bath, 0.54 g (2.46 mmol) of $CpTiCl_3$, 0.4 mL (1.2 mmol) of $Ti(OBu)_4$ and 30 mL of n-hexane were transferred. In this suspension heated up to 50° C. and under stirring, 0.8 mL (3.15 mmol) of diluted TIBAL in n-hexane (Al/$CpTiCl_3$=4) was slowly added. The dark solution obtained was stirred for 1 h at 50° C.

In the catalytic support obtained after the treatment with TMAL, 50 mL of n-hexane was again added and the suspension was heated up to 50° C. In this suspension stirred at 100 rpm, the dark solution obtained from the reaction between $CpTiCl_3$, $Ti(OBu)_4$ and TIBAL was slowly added and, after the addition was ended, the suspension was stirred at 100 rpm at 50° C. for 1 h. Elapsed this period, in the suspension, a diluted solution of 0.22 mL of $SiCl_4$ (2 mmol) was added in n-hexane. The reaction was kept at 50° C. under stirring for one extra hour and, then, the temperature was reduced to 30° C. The solid obtained was filtered and dried under fluidization with nitrogen.

The supported complex obtained was characterized, presenting the following characteristics:

THF Content: 2.2% wt
Ti Content: 3.4% wt
Mg Content: 2.2% wt
Al Content: 2.9% wt
Cl Content: 9.3% wt
$D_{50}$: 61 μm

Example 5 b) Preparation of the Supported Complex

In a 200-mL reactor equipped with mechanical stirring and previously purged with nitrogen, 6.6 g of the catalytic support prepared in the step (a) of the EXAMPLE 1 and 50 mL of n-hexane were added. In this suspension, stirred at 200 rpm and the temperature of 25° C., it was slowly added 3.4 mL (9.9 mmol) of diluted TNHAL in n-hexane (Al/THF=1). The suspension was stirred for 2 h and after this period, the solvent was removed by siphonation. The catalytic support obtained, after this treatment, was characterized presenting the following characteristics:

THF Content: 1.8% wt

In a schlenk, equipped with magnetic stirrer and dipped in a heat oil bath, 0.67 g (3.1 mmol) of $CpTiCl_3$, 0.81 g (3.1 mmol) of $IndTiCl_3$ and 60 mL of n-hexane were transferred. In this suspension heated up to 55° C. and under stirring, 3.1 mL (12.2 mmol) of diluted TIBAL in n-hexane (Al/Ti=2) was slowly added. The dark solution obtained was stirred for 2 h at 55° C.

In the catalytic support obtained after the treatment with TNHAL, 50 mL of n-hexane was again added and the suspension was heated up to 55° C. In this suspension stirred at 100 rpm, the dark solution obtained from the reaction between $CpTiCl_3$, $Ti(OBu)_4$ and TIBAL was slowly added and, after the addition was ended, the suspension was stirred at 100 rpm at 55° C. for 2 h. Elapsed this period, the temperature was reduced to 30° C. The solid obtained was filtered and dried under fluidization with nitrogen.

The supported complex obtained was characterized, presenting the following characteristics:

THF Content: 1.1% wt

Ti Content: 1.3% wt

Mg Content: 2.2% wt

Al Content: 4.2% wt

Cl Content: 9% wt $D_{50}$: 60 μm

Example 6 b) Preparation of the Supported Complex

In a 200-mL reactor equipped with mechanical stirring and previously purged with nitrogen, 6.6 g of the catalytic support prepared in the step (a) of the EXAMPLE 1 and 50 mL of n-hexane were added. In this suspension, stirred at 200 rpm and the temperature of 25° C., it was slowly added 3.4 mL (9.9 mmol) of diluted TNHAL in n-hexane (Al/THF=1). The suspension was stirred for 2 h and after this period, the solvent was removed by siphonation. The catalytic support obtained, after this treatment, was characterized presenting the following characteristics:

THF Content: 3.1% wt

In a schlenk, equipped with magnetic stirrer and dipped in a heat oil bath, 0.67 g (2.5 mmol) of $IndTiCl_3$, 2.7 g (7.9 mmol) of $Ti(OBu)_4$ and 60 mL of n-hexane were transferred. In this suspension heated up to 55° C. and under stirring, 1.25 mL (4.9 mmol) of diluted TIBAL in n-hexane (Al/Ti=2) was slowly added. The dark solution obtained was stirred for 2 h at 55° C.

In the catalytic support obtained after the treatment with TNHAL, 50 mL of n-hexane was again added and the suspension was heated up to 55° C. In this suspension stirred at 100 rpm, the dark solution obtained from the reaction between $IndTiCl_3$, $Ti(OBu)_4$ and TIBAL was slowly added and, after the addition was ended, the suspension was stirred at 100 rpm at 55° C. for 2 h. Elapsed this period, in the suspension, a diluted solution of 1.5 mL of $SiCl_4$ (13 mmol) was added in n-hexane. The reaction was kept at 55° C. under stirring for more than one hour and, then, temperature was reduced to 30° C. The solid obtained was filtered and dried under fluidization with nitrogen.

The supported complex obtained was characterized, presenting the following characteristics:

THF Content: 1.9% wt

Ti Content: 4.3% wt

Mg Content: 2.0% wt

Al Content: 2.3% wt

Cl Content: 11.7% wt $D_{50}$: 60 μm

Example 7 b) Preparation of the Supported Complex

In a schlenk, equipped with magnetic stirrer and dipped in a heat oil bath, 0.64 g (2.92 mmol) of $CpTiCl_3$, 3.2 mL (9.41 mmol) of $Ti(OBu)_4$ and 30 mL of n-hexane were transferred. In this suspension heated up to 50° C. and under stirring, 1.46 mL (5.7 mmol) of diluted TIBAL in n-hexane (Al/$CpTiCl_3$=2) was slowly added. The dark solution obtained was stirred for 1 h at 50° C.

In a 200-mL reactor equipped with mechanical stirring and previously purged with nitrogen, 6.4 g of silica Sylopol 5550 and 50 mL of n-hexane were added. In this suspension stirred at 100 rpm, it was slowly added the drak solution obtained from the recation between $CpTiCl_3$, $Ti(OBu)_3$ and TIBAL and, after the end of the addition, the suspension was stirred at 100 rpm at 50° C. for 1 h. After this period, in the suspension, a diluted solution of 1.8 mL of $SiCl_4$ (15.7 mmol) was added in n-hexane. The reaction was kept at 50° C. under stirring for more than one hour and, then, temperature was reduced to 30° C. The solid obtained was filtered and dried under fluidization with nitrogen.

The supported complex obtained was characterized presenting the following characteristics:

Ti Content: 3.7% wt

Mg Content: 3.3% wt

Al Content: 1.3% wt

Cl Content: 13.8% wt $D_{50}$: 51 μm

Homopolymerization with Ethylene

In a 4-liter steel reactor of the Autoclave Engineer's Inc., it was performed, initially, a purge with $N_2$ for 1 hour at an temperature of 70° C. and, then, the reactor was cooled down to 30° C. After that, a suspension was transferred, in n-hexane, formed by the supported complex and TMAL (Al/Ti=300) followed by 280 g of anhydrous propane. Temperature was increased up to 60° C., and the remaining 520 g of anhydrous propane were added. After that, the temperature was increased up to 75° C. again, and, then, the reactor was fed with 7 bar of ethylene. The homopolymerization of ethylene was conducted in slurry for a period of 2 h, during which time the pressure of ethylene was steady. After this period, the reactor was cooled down to the room temperature, depressurized and open for polymer removal, with the resin being dried in stove (60° C.) during one hour. The results of catalytic activity, bulk density (B.D.), content of fines in the polymers (TFP) and flow time (TE) are presented in the Table 1 below. In Table 2, in its turn, the results of the polyethylene resins, such as intrinsic viscosity, viscosimetric molecular weight, polymer density (P.D.) and MWD, are presented.

TABLE 1

| Polymerization | Supported Metallocene Catalyst EXAMPLE | A (kg pol/g cat) | B.D. (g/cm³) | TFP (% wt) | TE (s) |
|---|---|---|---|---|---|
| 1 | 1 | 1.40 | 0.40 | 0 | 9.5 |
| 2 | 2 | 3.40 | 0.35 | 0.1 | 10.0 |
| 3 | 5 | 1.70 | 0.37 | 0.1 | 9.7 |
| 4 | 6 | 1.30 | 0.36 | 0.2 | 10.2 |
| 5 | 7 | 3.00 | 0.35 | 0.2 | 10.5 |

TABLE 2

| Polymerization | Supported Metallocene Catalyst EXAMPLE | η (dL/g) | Mv (g/mol) | P.D. (g/cm³) | MWD |
|---|---|---|---|---|---|
| 1 | 1 | 12.2 | 2,280,000 | 0.930 | 4.5 |
| 2 | 2 | 11.0 | 1,951,288 | 0.928 | n.a. |
| 3 | 5 | 13.0 | 2,496,068 | 0.929 | n.a. |
| 4 | 6 | 15.4 | 3,207,375 | 0.930 | n.a. |
| 5 | 7 | 12.2 | 2,247,780 | 0.930 | n.a. | n.a.: not analyzed

Copolymerization of Ethylene and Butene-1

In a 4-liter steel reactor of the Autoclave Engineer's Inc., it was performed, initially, a purged with $N_2$ for 1 hour at an temperature of 70° C. and, then, the reactor was cooled down until 30° C. After that, a suspension was transferred, in n-hexane, formed by the supported complex and TMAL (Al/Ti=300) followed by 280 g of propane. The temperature was increased until 60° C., and after the addition of α-olefin (different α-olefins) liquid (different volumes), the remaining 520 g of propane was added. Then, the temperature was increased again until 75° C. and, then, the reactor was fed with 7 bar of ethylene. The copolymerization of ethylene with different α-olefins was conducted in slurry for a period of 2 h, during which time the pressure of ethylene was kept constantly. After this period, the reactor was cooled down until the room temperature, depressurized and opened for polymer removal, with the resin being dried in stove (60° C.) during one hour. The results of catalytic activity, bulk density (B.D.), content of fines in the polymers (TFP) and flow time (TE) are presented in the Table 3 below. In Table 4, in its turn, the results of the polyethylene resins, such as intrinsic viscosity, viscosimetric molecular weight, polymer density (P.D.), content of butene-1, melting temperature and MWD, are presented.

TABLE 3

| Polymerization | Supported Metallocene Catalyst EXAMPLE | $V_{C4}$= (mL) | A (kg pol/g cat) | B.D. (g/cm³) | TFP (% wt) | TE (s) |
|---|---|---|---|---|---|---|
| 10 | 1 | 100 | 3.53 | 0.41 | 0 | 9.0 |
| 11 | 1 | 600 | 7.10 | 0.39 | 0 | 9.3 |
| 12 | 3 | 600 | 4.93 | 0.33 | 0.2 | 11.0 |
| 13 | 4 | 100 | 1.40 | 0.36 | 0.1 | 10.0 |
| 14 | 4 | 600 | 1.84 | 0.34 | 0.1 | 10.5 |
| 15 | 5 | 600 | 0.74 | 0.36 | 0.2 | 10.0 |
| 16 | 6 | 600 | 4.30 | 0.34 | 0.2 | 10.0 |
| 17 | 7 | 600 | 5.00 | 0.38 | 0.1 | 9.0 |

TABLE 4

| Polymerization | Supported Metallocene Catalyst EXAMPLE | η (dL/g) | Mv (g/mol) | P.D. (g/cm³) | $C_4^=$ (% wt) | $T_{m2}$ (° C.) | MWD |
|---|---|---|---|---|---|---|---|
| 10 | 1 | 9.5 | 1,550,000 | 0.914 | 6.2 | 122 | 5.3 |
| 11 | 1 | 7.1 | 1,040,447 | 0.909 | 8.7 | 124 | 5.1 |
| 12 | 3 | 6.6 | 898,792 | 0.906 | 4.9 | 118 | n.a. |
| 13 | 4 | 10.2 | 1,735,954 | n.a. | 2.3 | 125 | n.a. |
| 14 | 4 | 8.9 | 1,410,397 | n.a. | 3.9 | n.a. | n.a. |
| 15 | 5 | 9.6 | 1,600,000 | 0.905 | 6.6 | 119 | 5.7 |
| 16 | 6 | 8.0 | 1,245,000 | 0.909 | 6.2 | 116 | 5.4 |
| 17 | 7 | 6.4 | 865,000 | 0.900 | 10.6 | n.a. | n.a. | n.a.: not analyzed

Copolymerization of Ethylene and Different α-Olefins

In a 4-liter steel reactor of the Autoclave Engineer's Inc., it was performed, initially, a purged with $N_2$ for 1 hour at an temperature of 70° C. and, then, the reactor was cooled down until 30° C. After that, a suspension was transferred, in n-hexane, formed by the supported complex and TMAL (Al/Ti=300) followed by 280 g of propane. The temperature was increased until 60° C., and after the addition of α-olefin (different α-olefins) liquid (different volumes), the remaining 520 g of propane was added. Then, the temperature was increased again until 75° C. and, then, the reactor was fed with 7 bar of ethylene. The copolymerization of ethylene with different α-olefins was conducted in slurry for a period of 2 h, during which time the pressure of ethylene was kept constantly. After this period, the reactor was cooled down until the room temperature, depressurized and opened for polymer removal, with the resin being dried in stove (60° C.) during one hour. The results of catalytic activity and bulk density (B.D.) are presented in the Table 5 below. In Table 6, however, the results of the polyethylene resins, such as intrinsic viscosity, viscosimetric molecular weight, polymer density (P.D.), content of incorporated α-olefin, melting temperature and MWD, are presented.

TABLE 5

| Polymerization | Supported Complex EXAMPLE | α-olefin | $V_{Cn}$= (mL) | A (kg pol/g cat) | B.D. (g/cm³) |
|---|---|---|---|---|---|
| 18 | 2 | Propene | 300 | 5.75 | 0.38 |
| 19 | 2 | 4-Methyl-pentene-1 | 300 | 1.13 | 0.36 |
| 20 | 2 | Dodecene-1 | 100 | 3.20 | 0.37 |
| 21 | 2 | Hexene-1 | 300 | 3.44 | 0.39 |

4-MP-1 = 4-methyl-pentene-1

TABLE 6

| Polymerization | Supported Complex EXAMPLE | η (dL/g) | Mv (g/mol) | P.D. (g/cm³) | $C_n^=$ (% wt) | $T_{m2}$ (° C.) | DPM |
|---|---|---|---|---|---|---|---|
| 18 | 2 | 4.4 | 499,786 | n.a. | 15.6 | n.d. | 7.6 |
| 19 | 2 | 12.1 | 2,244,297 | 0.924 | n.a. | 123 | 9.7 |
| 20 | 2 | 13.0 | 2,503,149 | 0.923 | n.a. | n.a. | n.a. |
| 21 | 2 | 10.2 | 1,728,252 | n.a. | 1.2 | n.a. | 5.5 | n.a.: not analyzed
n.d.: not determined

It must be evident o all those acquiring knowledge about this technique that the present invention can be configurated of other specific forms without getting away from the spirit or scope of the invention. Particularly, it must comprise that the invention can be configured in the described forms.

Therefore, the present examples and configurations must be considered as illustrative and not restrictive, and the invention must not be limited to the details supplied in this document, but can be modified within the scope and equivalent of the attached claims.

The invention claimed is:

1. Supported bimetallic catalysts, wherein said catalysts are formed by the mixture of two transition metals in a catalytic support and an activator based on one or more organometallic compounds selected from the group consisting of trimethylaluminum (TMAL), triethylaluminum (TEAL), tri-isobutilaluminum (TIBAL), tri-n-hexylaluminum (TNHAL), tri-n-octilaluminum (TNOAL), dimethylaluminum chloride (DMAC), methylaluminum dichloride (MADC), diethylaluminum chloride (DEAC), ethylaluminum dichloride (EADC), di-isobutylaluminum chloride (DIBAC), isobutylaluminum dichloride (MONIBAC), ethylmagnesium butyl (BEM), octilmagnesium butyl (BOMAG) and di-n-hexylmagnesium (DNHM), in the presence of an organic solvent of the aliphatic hydrocarbon group, wherein said catalysts are formed by the mixture of two or more metallocenes having transition metals of group 5 of the Periodic Table, and ligands selected from the group consisting of alkyl, monoindenyl and monofluorenyl groups, substituted or not, and wherein said catalytic support is formed by a silica containing a mixture of one or more organometallic compounds of groups 2 or 13 of the Periodic Table, at least one magnesium-based compound and a polar solvent.

2. Supported bimetallic catalysts according to claim 1, wherein the reaction of said catalysts with an organometallic compound of groups 2 or 13 of the Periodic Table, in the presence of ethylene and alternatively an α-olefin, results in ethylene copolymers with α-olefins of high and ultra high molecular weight comprising (1) broad molecular weight distribution (MWD) ranging from 3 to 8, (2) controlled morphology, spherical, presenting high bulk density (B.D.), ranging from 0.33 and 0.47 g/cm$^3$, low TFP, between 0 and 0.3%-wt and good flowability, with TE ranging from 5 and 12 seconds, (3) an intrinsic viscosity (h) ranging from 2 to 30 dL/g, (4) viscosimetric molecular weight (Mv) ranging from 200,000 to 10,000,000 g/mol, and (5) density in the molded (P.D.) ranging from 0.932 to 0.890 g/cm$^3$.

3. Supported bimetallic catalysts according to claim 2, in which the ethylene copolymer intrinsic viscosity ranges from 4 to 28 dL/g.

4. Supported bimetallic catalysts according to claim 3, in which the ethylene copolymer viscosimetric molecular weight (Mv) ranges from 500,000 to 9,000,000 g/mol.

5. Supported bimetallic catalysts according to claim 1, wherein said one or more organometallic compounds of groups 2 or 13 of the Periodic Table in the catalyst support are selected from the group consisting of trimethylluminum (TMAL), triethylaluminum (TEAL), tri-isobutilaluminum (TIBAL), tri-n-hexilaluminum (TNHAL),tri-n-octilaluminum (TNOAL), dimethylaluminum chloride (DMAC), methylaluminum dichloride (MADC), diethylaluminum chloride (DEAC), ethylaluminum dichloride (EADC), di-isobutylaluminum chloride (DIBAC), isobutylaluminum dichloride (MONIBAC), n-butylethylmagnesium (BEM), di-n-hexylmagnesium (DNHM), octilmagnesium butyl (BOMAG), methylmagnesium chloride and ethylmagnesium chloride.

6. Supported bimetallic catalysts according to claim 1, wherein said magnesium-based compound in the catalyst support is selected from the group consisting of magnesium dichloride (MgCl$_2$), magnesium ethoxy chloride (Mg(OCH$_2$CH$_3$)Cl), magnesium ethyl chloride (Mg(CH$_2$CH$_3$)Cl), diethyl magnesium (Mg(CH$_2$CH$_3$)$_2$) and diethoxy magnesium (Mg(OCH$_2$CH$_3$)$_2$).

7. Supported bimetallic catalysts according to claim 1, wherein said polar solvent in the catalyst support is selected from the group consisting of ethyl ether, tetrahydrofuran, ethyl alcohol and ketone methylethyl.

* * * * *